(12) United States Patent
Knibbe et al.

(10) Patent No.: US 9,832,080 B2
(45) Date of Patent: Nov. 28, 2017

(54) METHOD AND DEVICE FOR COMMISSIONING OF NODES OF A NETWORK

(71) Applicant: PHILIPS LIGHTING HOLDING B.V., Eindhoven (NL)

(72) Inventors: Engel Johannes Knibbe, Eindhoven (NL); Cornelis Antonius Verbakel, Eindhoven (NL); Eric Johannus Hendricus Cornelis Maria Nieuwlands, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 161 days.

(21) Appl. No.: 14/397,785

(22) PCT Filed: May 1, 2013

(86) PCT No.: PCT/IB2013/053445
§ 371 (c)(1),
(2) Date: Oct. 29, 2014

(87) PCT Pub. No.: WO2013/164772
PCT Pub. Date: Nov. 7, 2013

(65) Prior Publication Data
US 2015/0106508 A1    Apr. 16, 2015

Related U.S. Application Data

(60) Provisional application No. 61/641,959, filed on May 3, 2012.

(51) Int. Cl.
*G06F 15/173* (2006.01)
*H04L 12/24* (2006.01)
(Continued)

(52) U.S. Cl.
CPC .............. *H04L 41/12* (2013.01); *H04L 61/20* (2013.01); *H04L 67/125* (2013.01);
(Continued)

(58) Field of Classification Search
USPC ................................ 709/224, 220, 217, 223
See application file for complete search history.

(56) References Cited

U.S. PATENT DOCUMENTS 7,566,137 B2    7/2009  Veskovic
8,035,320 B2    10/2011 Silbert
(Continued)

FOREIGN PATENT DOCUMENTS

CN    102106188A A    6/2011
CN    201887986 U     6/2011
(Continued)

*Primary Examiner* — Lan-Dai T Truong

(57) ABSTRACT

The present invention provides a method for commissioning of nodes of a network. The method comprises the steps of (S10) receiving, at a first node (30a) of the network, at least one indication message including identification information of a second node (30b) of the network; (S20) receiving, at the first node (30a), parameter information indicating a parameter sensed with at least one parameter sensor associated with the first node (30a); (S30) determining whether the at least one indication message and the parameter information temporarily correlate; and (S40), if a correlation is determined, adding correlation information about the second node (30b) to a register table of the first node (30a).

14 Claims, 3 Drawing Sheets

(51) Int. Cl.
*H05B 37/02* (2006.01)
*H04L 29/12* (2006.01)
*H04L 29/08* (2006.01)

(52) U.S. Cl.
CPC ..... *H05B 37/0218* (2013.01); *H05B 37/0245* (2013.01); *Y02B 20/46* (2013.01)

(56) References Cited

U.S. PATENT DOCUMENTS

| | | | |
|---|---|---|---|
| 8,138,690 B2 | 3/2012 | Chemel et al. | |
| 2007/0102304 A1* | 5/2007 | Tam | G01N 27/3271 |
| | | | 205/792 |
| 2007/0262863 A1* | 11/2007 | Aritsuka | H04B 17/27 |
| | | | 340/539.22 |
| 2008/0192483 A1 | 8/2008 | Mangiardi | |
| 2009/0066473 A1 | 3/2009 | Simons | |
| 2009/0262189 A1 | 10/2009 | Marman | |
| 2010/0201267 A1 | 8/2010 | Bourquin et al. | |
| 2010/0225484 A1 | 9/2010 | Kpenv | |
| 2010/0277080 A1 | 11/2010 | Waffenschmidt et al. | |
| 2010/0321528 A1* | 12/2010 | Yu | H04N 5/23203 |
| | | | 348/231.2 |
| 2011/0001438 A1* | 1/2011 | Chemel | H05B 37/029 |
| | | | 315/297 |
| 2011/0019679 A1* | 1/2011 | Akahane | H04L 12/437 |
| | | | 370/401 |
| 2011/0031897 A1 | 2/2011 | Henig | |
| 2011/0199004 A1 | 8/2011 | Henig | |
| 2011/0246748 A1* | 10/2011 | Talwar | G06F 9/5077 |
| | | | 712/30 |
| 2011/0255418 A1* | 10/2011 | van Greunen | H04L 41/0659 |
| | | | 370/242 |

FOREIGN PATENT DOCUMENTS

| | | |
|---|---|---|
| CN | 102148940 A | 8/2011 |
| JP | 10106759 A | 4/1998 |
| WO | 2007029186 A1 | 3/2007 |
| WO | 2010010493 A2 | 1/2010 |
| WO | 2010097737 A1 | 9/2010 |
| WO | 2011055259 A1 | 5/2011 |

* cited by examiner

METHOD AND DEVICE FOR COMMISSIONING OF NODES OF A NETWORK

CROSS-REFERENCE TO PRIOR APPLICATIONS

This application is the U.S. National Phase application under 35 U.S.C. §371 of International Application No. PCT/IB2013/053445, filed on May 1, 2013, which claims the benefit of U.S. Provisional Patent Application No. 61/641,959, filed on May 3, 2012. These applications are hereby incorporated by reference herein.

FIELD OF THE INVENTION

The invention relates to a method and a device for commissioning of nodes of a network, particularly to a method and a device for commissioning of light sources of a lighting system, wherein control of light sources on an individual and local basis is required.

BACKGROUND OF THE INVENTION

Municipal authorities are under pressure to improve energy efficiency in order to comply with legislation and environmental objectives. They are also facing calls to address the issue of light pollution, specifically for the sake of night and nature preservation. Yet, at the same time, safety remains a paramount concern. Therefore, research has been conducted on systems that provide light only where and when it is needed. Such systems need to be designed to minimize waste of light without compromising people's safety. For instance, such systems sense activities around individual light sources, adjust the lighting to a maximum level when there is activity and to extremely low levels when there is no activity. Such a system may save up to 80% of energy costs while maintaining safety on the streets.

In such light-on-demand systems, for instance realized with the applicant's LumiMotion, it is required for a node (e.g. a street light) to react to the detection of a street user at a neighboring node located within a certain range. Accordingly, when a node receives a detection message from another node, it needs to know whether to react to this message or not. In other words, the node needs to know whether it is only in hearing range without the need of any action, or whether the message originates from a relevant neighbor node and an action has to be taken (e.g. switching on a lamp). In order to make this distinction, a light-on-demand system generally keeps a table of neighbor nodes and decides, based on the position of the transmitting node in a table, whether it should react or not.

In current systems, the table is created by using the identity of the transmitting node and the averaged RSSI (Received Signal Strength Indication) value of the messages of said transmitting node and ranking the table from strong to weak RSSI. However, the relationship between RSSI values and distances is a questionable one, and it is possible for nodes to be in a wrong position in a table. In certain cases, this may lead to unacceptable behavior of the system and, thus, a correction of the table is required. That means the table has to be manually adapted on-the-spot by a field engineer, for instance using a mobile computer. This adaptation that is required for each node that does not behave as required leads to inconvenience and increased costs.

WO 2007/029186 describes a method for lighting commissioning, which determines a location of a lighting device from the identification number of said lighting device. The location is determined by transmitting an indicator command including the first identification number to the lighting device in question and detecting the response of the lighting device to said indicator command. The lighting device location is then entered manually or automatically on a map.

SUMMARY OF THE INVENTION

It is an object of the present invention to provide a method and a device, for commissioning nodes of a network, which enable reliable determination of a register table, preferably of tables of neighbors of nodes of the network.

The object is achieved by the features of the independent claims.

The invention is based on the idea to draw conclusions from a correlation (coincidence) between a received indication message and a sensed physical parameter. When a physical parameter (e.g. light intensity) sensed with a sensor of a first node changes (or has a certain value), and the first node receives in temporal correlation with said sensed change (or certain value) an indication message comprising identification information, such as a unique node number, network address, etc., of a second node, the first node may conclude that the physical parameter is associated with the second node having said identification information. Hence, the first node may conclude from the temporal (chronological) correlation between the sensed physical parameter and the reception of the indication message that the second node is a neighbor node. In this case, the first node may add correlation information preferably comprising the identification information of the second node to its register table that is preferably a table of neighbors.

According to an aspect of the present invention, a method for commissioning of nodes of a network preferably comprises the steps of receiving, at a first node of the network, at least one indication message including identification information of a second node of the network;

receiving, at the first node, parameter information indicating a parameter sensed with at least one parameter sensor associated with the first node;

determining whether the at least one indication message and the parameter information temporarily correlate with one another; and if a correlation is determined, adding correlation information about the second node to a register table of the first node.

Accordingly, when the first node receives an indication message sent to or from the second node and including identification information of the second node, and a parameter sensor associated with the first node senses for instance a change of a (physical) parameter in temporal correlation with the reception of the indication message, it can be concluded that said change is associated with the second node having said identification information. The indication message is received by the first node via the network. Independently of the reception of the indication message, the parameter sensor senses the physical parameter and then provides corresponding parameter information to the first node using one of: the network, wired communication or wireless communication (e.g. Infrared, Bluetooth and the like). Temporal correlation may include that both events (change and reception) happen substantially at the same time or within a predetermined time interval. Further, a temporal correlation may only be determined (approved) when the sensed parameter change satisfies at least one predetermined condition (e.g. is within a predefined range).

As explained above, the parameter sensor may sense a change of the parameter. However, the parameter sensor may also sense a parameter state, e.g. whether the parameter is present or not (e.g. light on or off) or a parameter value (e.g. a dimming level). Temporal correlation in this case may include that the reception of the indication message and the parameter state sensed substantially at the same time or within a predetermined time interval correlate with one another. The correlation is preferably only determined (approved) when the sensed parameter state satisfies at least one predetermined condition. For instance, the sensed parameter state may be compared with a predetermined parameter state. For example, when the first node receives the indication message and the parameter sensor senses that the parameter is present (e.g. light on) substantially at the same time, the first node may determine the correlation. In the following, the term "sensing the parameter" includes sensing the above-described change or state.

The parameter sensor senses the parameter and then provides the first node with parameter information indicating the sensed parameter (e.g. parameter state and/or parameter change). Preferably, there is a direct correlation between information included in the indication message and the parameter information. For instance, the indication message may indicate that a lamp associated with the second node is now dimmed up. When the parameter sensor of the first node senses an increase in light intensity substantially at the same time with the reception of the indication message, a correlation can be reliably determined (i.e. it may be concluded that the first node and the second node are neighbors).

The parameter information may further include spatial information about the sensed parameter with respect to the sensor and/or the first node. The spatial information may include at least one of: direction information (e.g. geographic direction etc.) of the sensed parameter with respect to the sensor and/or the first node and distance information (e.g. obtained by RSSI etc.). Direction information may be obtained by using a direction-sensitive parameter sensor. Said parameter information may then at least in part be included in the correlation information described below.

As explained above, a temporal correlation is determined when the reception of the indication message and the reception of the parameter information temporarily correlate with one another, i.e. when they happen substantially at the same time or within a predetermined time interval. Hence, the steps of receiving the indication message and receiving the parameter information may occur in any order. In particular, the first node may first receive the indication message and then receive the parameter information, and vice versa.

Preferably, the first node first receives the indication message and then its parameter sensor senses the parameter upon a request/command by the first node. In this case, the parameter sensor may only be activated (operated) when an indication message is received, and may be disabled otherwise. This allows to save power, since the parameter sensor is only operated when necessary. However, the parameter sensor may also be operated continuously.

The indication message may be sent from or to the second node. In particular, the second node may send the indication message (e.g. using flooding) under predetermined conditions, for instance when a motion sensor of the second node senses motion in the surrounding area thereof and/or an operation state of the second node and/or a load associated therewith are changed. Further, the indication message that is sent to the second node may be a message that is distributed over the network (e.g. by flooding) by a central controller or any other node in the network and that is received and retransmitted by a plurality or even all nodes. Accordingly, the first node may receive the indication message that is intended for the second node and may acknowledge the content of said message for determining the correlation.

Preferably, the register table is a table of neighbors of the first node. That is, based on the correlation between the sensed parameter and the received indication message it may be concluded that the first node and the second node are neighbors. Accordingly, the first node can build (create) and/or update a register table having correlation information of neighbor nodes. In particular, the register table may include one or more entries each defining a relationship between the first node and a respective other node of the network. The relationship may be represented by the correlation information. The correlation information for a neighbor node may include at least the identification information included in the indication message sent from or to the second node. In other words, the first node knows the identities and/or locations of its neighbor nodes. Hence, the first node can reliably build (create) and/or update its table of neighbor nodes, in particular direct neighbor nodes, without the risk that a node is in the wrong position in the table. Accordingly, the problem associated with the state of the art that the first node reacts (e.g. switches on a lamp) based e.g. on a message received from a distant node that is wrongly designated as neighbor node, has been overcome.

Preferably, the first node initially creates its register table, using the method according to the present invention. Further, the first node may update the register table continuously (i.e. every time an indication message is received and a correlation with a sensed parameter is determined), on demand (e.g. based on a request/command by a central controller or a user input at the first node), or periodically.

Preferably, in addition to the identification information of the second node, the indication message further includes at least one of operation state information of the second node and/or a load associated therewith, detection information sensed with a respective sensor located in, at or near the second node (ambient light intensity, temperature, etc.), motion information associated with a surrounding area of the second node and sensed by a motion sensor located in, at or near the second node, absolute location information of the second node in the network, and commands addressing at least the second node.

For instance, the operation state information (e.g. "light on") of the second node may be related to the parameter (e.g. light intensity) sensed with the at least one parameter sensor associated with the first node. In the case of a lighting system, the motion information may comprise information associated with a person passing the second node, e.g. a lamp. Hence, a reliable correlation between said message and the sensed parameter can be established. Further, the indication message may include absolute location information of the second node, e.g. GPS coordinates and/or virtual coordinates within the network. Additionally or alternatively, the indication message may include commands addressing at least the second node. For instance, the indication message may include a command that instructs the second node to change an operation state. This change may then be detected by the parameter sensor of the first node and hence, the reliability of the determined correlation can be enhanced.

Preferably, the correlation information that is added to the register table of the first node includes the identification information of the second node included in the indication message, wherein the identification information may comprise network address information of the second node. Additionally or alternatively, the correlation information may include at least in part the above-explained information included in/obtained by the indication message. Further, the correlation information may include location information of the second node. The location information may comprise absolute and/or relative location information. The absolute location information may comprise GPS coordinates and/or virtual coordinates in the network that are preferably obtained by the indication message, as described above. The relative location information may indicate a location of the second node relative to the first node, either in terms of real coordinates (e.g. GPS) or virtual coordinates (e.g. by means of hop counts in an ad-hoc network). The relative location information may be derived by the first node itself using e.g. its own known GPS/virtual coordinates (e.g. stored in a memory of the first node) and the GPS/virtual coordinates of the second node included in the indication message. Furthermore, the correlation information may comprise at least in part the parameter information described above.

Preferably, the first node notifies at least the second node about the correlation, e.g. that they are neighbor nodes. In particular, the first node may transmit its own identification information at least to the second node, including a notification indicating that they are neighbor nodes. Additionally or alternatively, the first node may transmit the correlation information, at least in part, to at least the second node. Preferably, the first node additionally or alternatively notifies, and/or transmits the correlation information at least in part to, at least one other node of the network, e.g. a central controller. This allows for a fast building/creating/updating of neighbor tables of a plurality of nodes.

Preferably, existing correlation information is deleted from the register table when no correlation occurs. The register table may include one or more entries, each defining a relationship between the first node and a respective other node of the network. The relationship may be represented by the correlation information. When the first node receives an indication message indicating a change of an operation state of a direct neighbor (second node) or a change of an operation state of a load associated therewith, and no such change is sensed by the parameter sensor of the first node, the second node may be determined not to be a direct neighbor (anymore) and the corresponding entry (e.g. including correlation information) may be deleted from the register table of the first node. This ensures that the register table is kept up to date, even if positions and/or a number of nodes in the network change. The first node may delete existing correlation information only when no correlation has been determined for a predetermined number of times. For instance, if the first node has received two or more indication messages associated with a second node and no temporal correlation with parameter information has been determined in a predetermined percentage of the cases or even in each case, then the second node may be deleted from the register table of the first node.

Preferably, the steps of the method for commissioning of nodes are performed a plurality of times before correlation information (an entry) is added to the register table. In other words, correlation information is only added to the register table of the first node when a correlation is determined (approved) a plurality of times. Preferably, a certainty of correlation is determined and stored in a temporary register table, and when the certainty reaches a predetermined threshold (i.e. a correlation has been determined/approved for a predetermined number of times), the correlation information is added to the register table. Hence, the reliability of the correlation information is further increased, since for instance a coincidence between a received indication message and received parameter information, that are in fact not correlated, is not considered and does not lead to an incorrect entry into the register table. For instance, in the case of a street lighting system, the first node may receive an indication message indicating that a lamp of the second node, that is not a neighbor node but a distant node, is dimmed up. When at the same time the parameter sensor of the first node senses an increase in light intensity, e.g. caused by a passing car, a correlation is determined and the second node is wrongly added to the register table as neighbor node. This can be avoided by adding correlation information to the register table of the first node only when a correlation is determined (approved) a plurality of times.

Preferably, the method further comprises instructing at least one node of the network to change its operation state or an operation state of a respective associated load. Preferably, the indication message includes said instruction. In this case, a central controller or another node (e.g. a neighbor node) may request the change of the operation state by sending the indication message to the second node. Alternatively, the second node is instructed (e.g. by a command message) and then sends the indication message including for instance an acknowledgment and/or information regarding the changed operation state.

Preferably, for first building (creating) a register table of the first node or for updating said register table, the above-explained instruction scheme may be used. For instance, all nodes or at least some of the nodes of the network may be sequentially instructed to change an operation state by a central controller or by the first node. Temporarily correlated with each instructed change, an indication message associated with said change is transmitted over the network, for instance by a central controller or by the respective node associated with the change. Alternatively, a command message instructing the operation state change may serve as indication message. When the first node receives said indication message and also receives parameter information sensed by its associated parameter sensor substantially at the same time or within a predetermined time interval, a correlation is determined. Hence, it may be determined that the identification information included in the indication message belongs to (identifies) a node that is within a sensing range of the parameter sensor of the first node, which node is preferably a neighbor node of the first node. By virtue of this, a correct and reliable register table of the first node can be built/created on demand.

Preferably, the method further comprises adjusting an operation state of at least one load associated with the first node when a correlation is determined. This enables the first node to immediately react to the sensed parameter or a change thereof. For instance, when the indication message includes motion information obtained from a motion sensor of the second node (e.g. caused by a person passing the second node), and the indication message is received in temporal correlation with the parameter information (e.g. "light on" at the second node) at the first node, then the first node may switch on a lamp associated therewith. Accordingly, in this example lamps positioned along a sidewalk could be sequentially switched on to selectively illuminate areas the detected person passes. This reduces power consumption, since lamps are only switched on when and where it is required. Further, this ensures that the first node only reacts to indication messages from neighbor nodes, and not to all indication messages received.

Preferably, the method further comprises combining the register table of the first node with at least one further register table received from at least one other node in the network. Further, the first node may transmit its register table over the network to at least one other node of the network and/or a central controller. Hence, nodes of the network and/or the central controller may combine all received register tables to obtain for instance an overall register table of the whole network or a part of the network. This enables a node to have a register table that includes nodes beyond the sensing range of its associated sensor. Accordingly, under predefined conditions the node may react to indication messages that are outside of the sensing range of its parameter sensor (e.g. next nearest neighbors).

Furthermore, by combining the register table of a certain node with at least one register table received from at least one other node, it is possible to create or update the register table without receiving information in the form of instructions/commands from the central controller.

Preferably, the method comprises a step of confirming correlation information in the register table or correlation information to be added to the register table. For this purpose, the first node may instruct the node designated by the correlation information to be confirmed to change an operation state thereof or to change an operation state of an associated load. When the parameter sensor of the first node senses that the instructed change is taking place, the correlation information is confirmed. This allows for checking whether the correlation information is correct or still valid. The first node may perform this confirmation step periodically or on demand in order to check whether its register table is still valid.

According to another aspect of the present invention, a device for commissioning of nodes of a network is provided. The device is preferably adapted to receive at least one indication message including identification information of a second node of the network, and to receive parameter information indicating a parameter sensed with at least one parameter sensor associated with a first node, to determine whether the at least one indication message and the parameter information temporarily correlate with one another, and, if a correlation is determined, to add correlation information about the second node to a register table of the first node.

The device is preferably adapted to carry out the method described above.

The device preferably includes means for receiving the indication message, such as a receiver or transceiver, a microcontroller or processor for data processing and for determining the correlation, and storage means for storing the register table.

The device may be operatively coupled to the at least one parameter sensor, or may include the at least one parameter sensor. The parameter sensor may also be included in the node or a load associated with the node. Preferably, the parameter sensor is a light sensor. The sensing range of the parameter sensor may be chosen such that at least one other node of the network is situated within said sensing range. Further, the parameter sensor may have a predetermined direction sensitivity. The latter allows to minimize disturbances. For instance, in the case of a lighting system, the sensor may sense parameter changes that are not associated with another (i.e. the second) node (e.g. car lights). This can be avoided by defining a predetermined direction sensitivity that preferably considers known sources of disturbances.

Alternatively or additionally, the parameter sensor may be adapted to sense at least one wavelength range. For instance, in the case of a lighting system the parameter sensor may be adapted to sense only, or react only to, characteristic wavelengths used in the lighting system, e.g. defined by specific kinds of lamps (halogen, LED, and the like). By virtue of this, it can be avoided that the parameter sensor senses or reacts to wavelengths other than the ones generated by the lighting system (e.g. head lights of cars).

Preferably, the device is integrated in or operatively coupled to the first node. The device may be adapted to communicate with the first node through wired and/or wireless means.

Preferably, the register table is a table of neighbors of the first node and the device is further adapted to combine the table of neighbors of the first node with at least one further table of neighbors received from at least one other node in the network. As already mentioned above, this allows the first node to build a table of neighbors (register table) that includes nodes beyond the reach of the at least one parameter sensor associated with the first node.

Preferably, the device is used in a lighting control system. This allows for selected illumination provided by a lamp associated with a node according to lighting demands, thereby saving energy.

Preferably, the at least one parameter sensor is a light sensor and the parameter information includes light intensity information. This is in particular advantageous in the above mentioned lighting control system.

According to a further aspect of the present invention, a system for commissioning of nodes of a network is provided. Preferably, the system comprises a plurality of nodes, at least one of them being coupled to a device as described above. The system is preferably adapted to carry out the method as described above.

Preferably, the network is a mesh network, a star network or a point to point communication between two nodes, wherein the network preferably uses wireless and/or wired communication. The wireless communication may include Bluetooth, infrared, RF, and the like. Further, the network may use a telecommunication network.

DETAILED DESCRIPTION OF THE EMBODIMENTS

In the following, the present invention is explained with respect to a lighting system. However, the present invention is not limited thereto and could be applied to various other applications employing a network.

Figure 1:
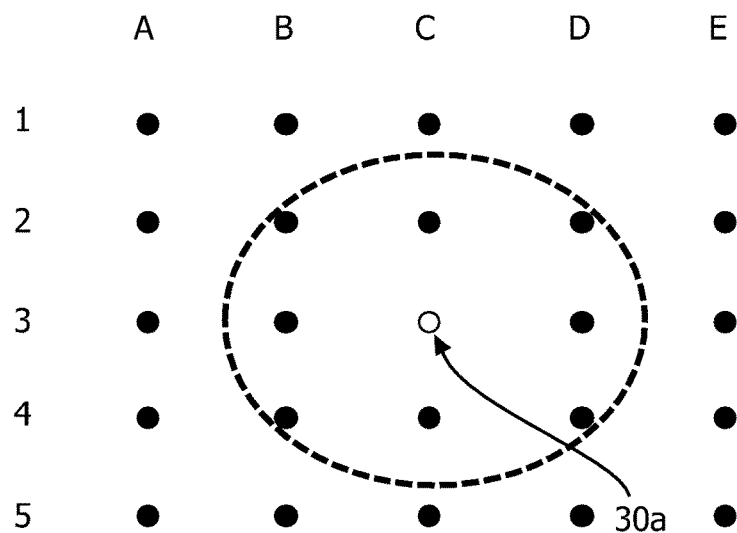
FIG. 1 is schematic view showing a network used in the present invention.

FIG. 1 shows a network of the present invention that has a plurality of nodes (i, j) (i=1, . . . , 5; j=A, . . . , E). The network may be a mesh network, a star network or may use point to point communication between two nodes using wireless and/or wired communication. The wireless communication may include Bluetooth, infrared, RF, and the like. Further, the network may use a telecommunication network. Although 25 nodes are shown in FIG. 1, the present invention is not limited thereto and could employ any suitable number of nodes. Each node may have a load associated therewith, for instance a lamp. In this example, a first node 30a (3C) has eight direct neighbor nodes 2B, 2C, 2D, 3B, 3D, 4B, 4C and 4D.

The first node 30a may have a parameter sensor 33 (see FIG. 2) associated therewith, which parameter sensor 33 is adapted to sense a physical parameter of other nodes, preferably of the direct neighbor nodes 2B, 2C, 2D, 3B, 3D, 4B, 4C and 4D. In a preferred embodiment, the parameter sensor 33 can only detect the physical parameter associated with at least one of the direct neighbor nodes 2B, 2C, 2D, 3B, 3D, 4B, 4C and 4D, and cannot detect physical parameters associated with other nodes, for instance the next nearest neighbor nodes. In FIG. 1 this is indicated by the dashed line.

The first node 30a is associated with a device 10 according to the present invention. The device 10 may be integrated in or operatively coupled to the first node 30a. The parameter sensor 33 may be integrated in or operatively coupled to the first node 30a, the load (lamp) associated with the first node 30a or the device 10.

Figure 2:
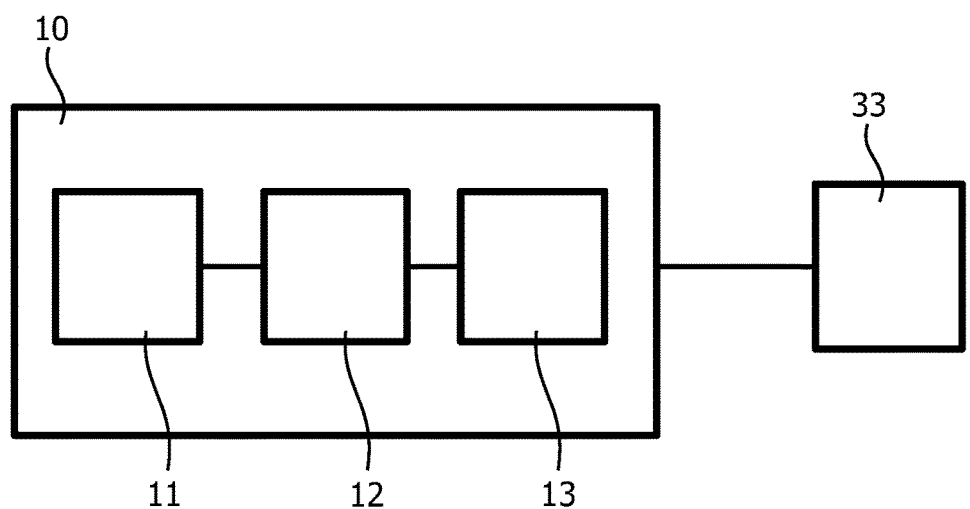
FIG. 2 shows a device according to the present invention.

FIG. 2 shows a device 10 according to the present invention being in communication with a parameter sensor 33. The device 10 includes a transceiver 11, a control unit 12 and storage means 13.

The transceiver 11 is adapted to receive messages communicated over the network, and in particular the at least one indication message sent from another node or a central controller. In a preferred embodiment, the transceiver 11 is also adapted to communicate with the parameter sensor 33. However, the parameter sensor 33 may also be directly coupled to the control unit 12 and/or may be integrated into the device 10. The parameter sensor 33 may be a light sensor adapted to detect light in the surrounding area of the device 10 and/or in the surrounding area of the first node 30a. The transceiver 11 may be further adapted to send messages/information over the network.

The control unit 12 may be a microprocessor and is coupled to the transceiver 11 and the storage means 13. The control unit 12 receives messages communicated over the network via the transceiver 11 and generates and transmits messages via the transceiver 11 over the network to other nodes of the network and/or to a central controller. The control unit 12 may be further adapted to read data from and write data to the storage means 13. The storage means 13 may have stored the register table of the first node 30a.

In a preferred embodiment, the device 10 is integrated in or coupled to the first node 30a.

Figure 3:
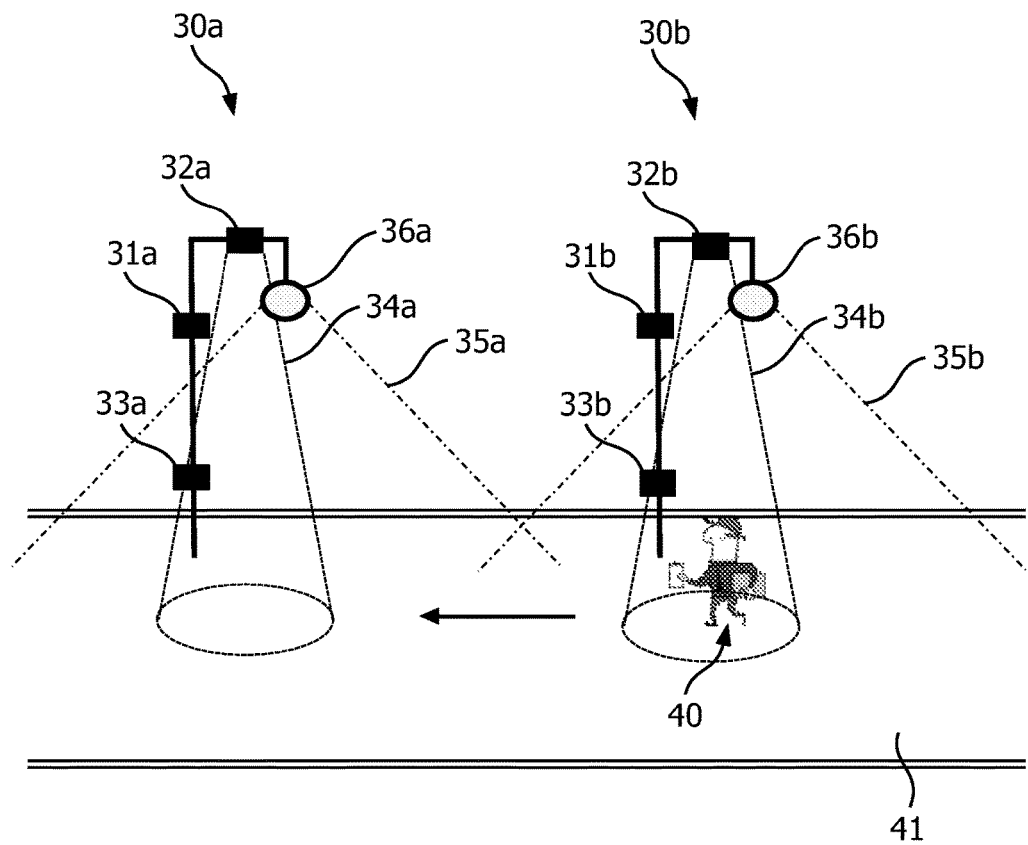
FIG. 3 shows a lighting system according to the present invention.

FIG. 3 shows a lighting system according to the present invention. Along a sidewalk 41 street lamps are arranged that correspond to nodes of the network. In FIG. 3 two street lamps are shown, wherein the left one represents the first node 30a and the right one represents a second node 30b of the present invention. The first node 30a comprises a first lamp 36a and the second node 36b comprises a second lamp 36b. The lamps 36a, 36b each have at least one light source such as an LED, a halogen lamp and/or the like. The lamps 36a, 36b illuminate the sidewalk 41, wherein an illumination area of the first lamp 36a is defined by a first illumination cone 35a and an illumination area of the second lamp 36b is defined by a second illumination cone 35b.

Further, the first node 30a comprises a first motion sensor 32a and the second node 30b comprises a second motion sensor 32b. The first motion sensor 32a has a first detection range 34a and the second motion sensor 32b has a second detection range 34b. Accordingly, the motion sensors 32a, 32b may be adapted to detect motion in the surrounding area of the respective node 30a, 30b. For instance, the second motion sensor 32b may detect a person 40 passing the second node 30b.

Furthermore, the first node 30a comprises a first parameter sensor 33a and the second node 30b comprises a second parameter sensor 33b. In this example, the parameter sensors 33a, 33b are light-sensitive sensors. The first parameter sensor 33a is adapted to detect light emitted from the second lamp 36b. The first parameter sensor 33a may be positioned such as to detect direct light or stray (diffused) light from the second lamp 36b. In FIG. 3, the first parameter sensor 33a is positioned outside of the second illumination cone 35b and can therefore only detect stray light from the second lamp 36b. By positioning the first parameter sensor 33a at the first node 30a, as shown in FIG. 3, the first parameter sensor 33a cannot only detect light from the second lamp 36 on its right side, but may also detect light emitted from a lamp positioned on its left side (i.e. a node positioned to its left). In other embodiments, the first parameter sensor 33a may be positioned between the first node 30a and the second node 30b or may be positioned directly at the second node 30b. Further, a node may also comprise at least two parameter sensors. For instance, the first node 30a may have one parameter sensor to detect light from a source on its left side and one parameter sensor to detect light from a source on its right side. Regarding positioning of the second parameter sensor 33b, the same applies as for the first parameter sensor 33a.

By means of the first parameter sensor 33a it may be determined whether the second lamp 36b is on or off. Alternatively or additionally, the first parameter sensor 33a may also be adapted to detect a dimming level of the second lamp 36b. The same applies vis a vis the second parameter sensor 33b.

The parameter sensors 33a, 33b may each be a camera. Preferably, the camera has a wide viewing angle (e.g. up to 180°). By virtue thereof, light from other nodes (lamps) can be seen in the image recorded by the respective camera.

The first node 30a has a first device 31a and the second node 30b has a second device 31b according to the present invention. However, for the present invention it is not necessary for all nodes to have a device according to the present invention. For instance, in the embodiment shown in FIG. 3 only the first node 30a could be provided with the device 31a and the second node 30b could have no device at all. In this case, only the second node 30b could have the motion sensor 32b and the first node 30a could have no motion sensor at all, and only the first node 30a could have the parameter sensor 33a and the second node 30b could have no parameter sensor at all.

In the following, an exemplary method according to the present invention is described with reference to FIG. 3. Coming from the right, in FIG. 3, the person 40 walks along the sidewalk 41 and passes the second node 30b. For ease of explanation, it is assumed that the second lamp is already on or is switched on when the person 40 enters the second detection range 34b. Said entering is detected by the second motion sensor 32b. Upon said detection, the second node 30b generates detection information and sends an indication message including said detection information and its identification information, such as for example a unique node number or network address, over the network (e.g. by flooding).

The indication message sent is received by the first node 30a, i.e. by a first transmitter 11 of the first device 31a. However, in other embodiments, the indication message might be received by another receiver/transceiver of the first node 30a and may then be provided to the first device 31a. When the first parameter sensor 33a that is operatively coupled to the first device 31a detects e.g. an increase in light intensity due to a dimming up of the second lamp 36b substantially simultaneously with the reception of the indication message (or when dimming and reception both occur within a predetermined time interval), the first device 31a concludes that the identification information included in the indication message identifies a direct neighbor, i.e. the second node 30b. Correlation information preferably including at least said identification information of the second node is then added to a register table (table of neighbors) of the first node 30a.

Accordingly, nodes positioned along the sidewalk may build and/or update their register tables when triggered to do so, i.e. when triggered by passing persons. Alternatively, the table of neighbors may be built (created) and/or updated on demand, e.g. by an instructed change of operation states as described above.

Additionally, the first node 30a may conclude e.g. from the detection information included in the indication message that the person 40 is walking towards the first node 30a and may thus switch on the first lamp 36a to provide illumination of the sidewalk 41.

In FIG. 3, two nodes 30a, 30b are shown. However, there may be provided any reasonable number of nodes, each or at least one of them having a device according to the present invention and being adapted to perform the functions as described above.

Figure 4:
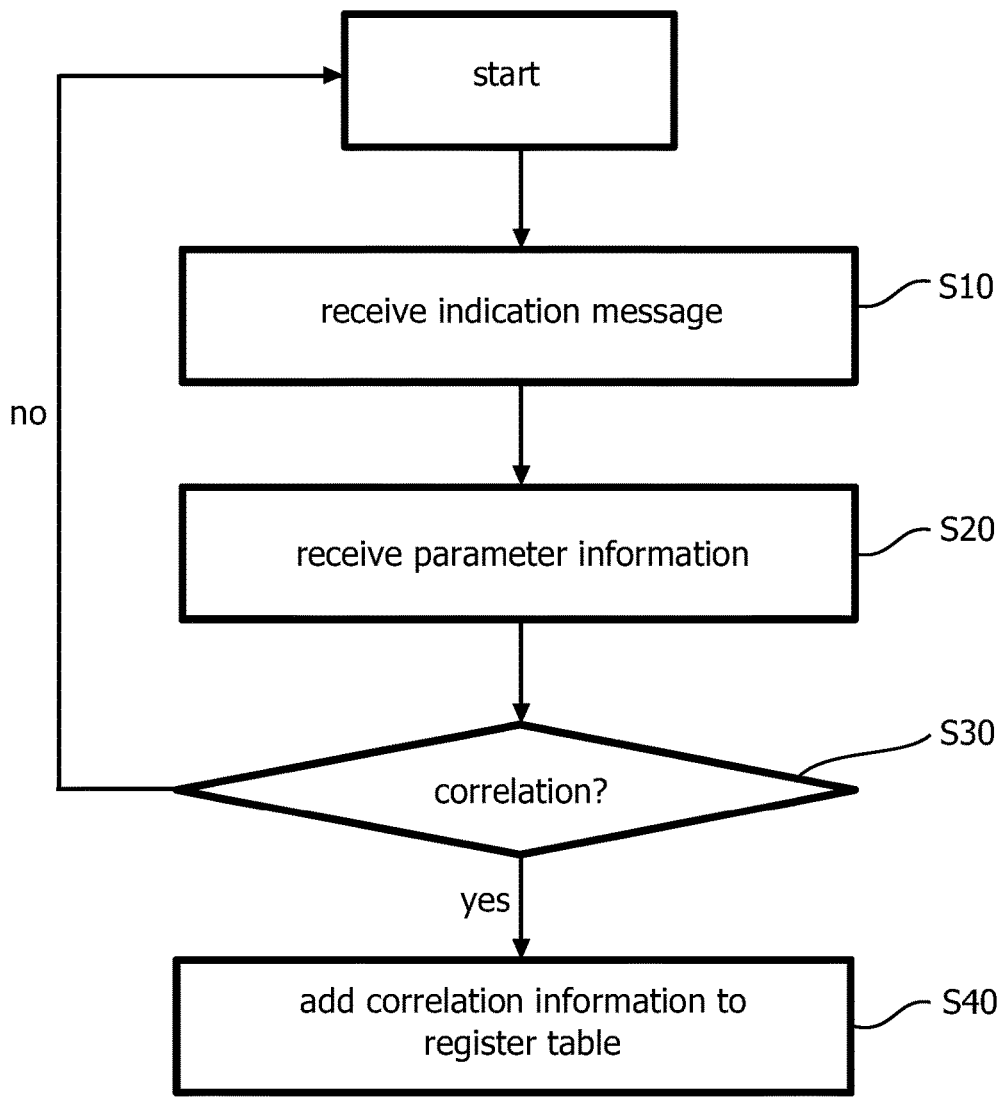
FIG. 4 shows a flow diagram of a method according to the present invention.

FIG. 4 shows a flow diagram of a method according to the present invention. In step S10, an indication message including identification information of a second node is received at a first node. Then, in step S20 parameter information indicating a parameter sensed with at least one parameter sensor associated with the first node is received. When it is determined in step S30 that the at least one indication message and the parameter information temporarily correlate (coincide) with one another, a correlation is determined (approved). When the correlation is approved, correlation information about the second node preferably including the identification information is added to a register table (table of neighbors) of the first node. If no correlation is determined, no correlation information is added to the register table.

The present invention provides a method, device and system enabling reliable determination of register tables, preferably of tables of neighbors. The present invention effectively prevents that nodes are wrongly designated as neighboring nodes.

The invention claimed is:

1. Method for commissioning of nodes of a network, comprising:
    receiving, at a first node of the network, at least one indication message including identification information of a second node of the network;
    receiving, at the first node, parameter information indicating a parameter sensed with at least one parameter sensor associated with the first node;
    determining whether the at least one indication message and the parameter information temporarily correlate with one another; and
    if a correlation is determined, adding correlation information about the second node (30b) to a register table of the first node
    wherein the register table is a table of neighbors of the first node and a device is further adapted to combine the table of neighbors of the first node with at least one further table of neighbors received from at least one other node in the network.

2. Method according to claim 1, wherein the register table is a table of neighbors of the first node.

3. Method according to claim 1, wherein the indication message further includes at least one of
    network address information of the second node;
    absolute location information of the second node
    operation state information of the second node and/or a load associated with the second node;
    detection information sensed with a respective sensor of the second node;
    motion information associated with a surrounding area of the second node and sensed by a motion sensor associated with the second node; and
    commands addressing at least the second node.

4. Method according to claim 1, wherein the correlation information includes at least one of
    identification information of the second node included in the indication message;
    network address information of the second node;
    absolute location information of the second node in the network; and
    relative location information of the second node with respect to the first node.

5. Method according to claim 1, wherein the parameter information includes at least one of
    operation state information of the second node and/or at least one load associated with the second node;
    information about a state and/or a change of the sensed parameter; and
    light intensity information.

6. Method according to claim 1, wherein existing correlation information about the second node is deleted from the register table of the first node when no correlation between the received indication message and the received parameter information occurs.

7. Method according to claim 1, wherein the steps of receiving an indication message, receiving parameter information and determining whether the indication message and the parameter information temporarily correlate with one another, are performed a plurality of times before a correlation is added to the register table.

8. Method according to claim 1, further comprising:
    instructing at least one node to change an operation state thereof or an operation state of a load associated therewith.

9. Method according to claim 1, further comprising:
    adjusting an operation state of at least one load associated with the first node when a correlation is approved.

10. Method according to claim 1, further comprising:
    combining the register table of the first node with at least one further register table received from at least one other node in the network.

11. Device for commissioning of nodes of a network, the device being adapted to
    a transceiver to receive at least one indication message including identification information of a second node of the network and receive parameter information indicating a parameter sensed with at least one parameter sensor associated with a first node;

a control unit to determine whether the at least one indication message and the parameter information temporarily correlate with one another, and if a correlation is determined, add correlation information about the second node to a register table of the first node, wherein the register table is a table of neighbors of the first node and the device is further adapted to combine the table of neighbors of the first node with at least one further table of neighbors received from at least one other node in the network.

12. Device according to claim 11, wherein the device is integrated in or operatively coupled to the first node.

13. Device according to claim 11, wherein the device is used in a lighting system having at least a first and second lamp nodes.

14. A system for commissioning of nodes of a network, comprising:

a plurality of nodes, at least one of them being coupled to a device, wherein the device includes a transceiver to receive at least one indication message including identification information of a second node of the network and receive parameter information indicating a parameter sensed with at least one parameter sensor associated with a first node;

a control unit to determine whether the at least one indication message and the parameter information temporarily correlate with one another, and if a correlation is determined, add correlation information about the second node to a register table of the first node, wherein the register table is a table of neighbors of the first node and the device is further adapted to combine the table of neighbors of the first node with at least one further table of neighbors received from at least one other node in the network.

* * * * *